(12) United States Patent
Marsden et al.

(10) Patent No.: US 8,128,165 B2
(45) Date of Patent: Mar. 6, 2012

(54) ENERGY-DISSIPATION SYSTEM

(75) Inventors: Andrew W. Marsden, Hingham, MA (US); Ward Fritz, Chelsea, MA (US); Walter S. Bezaniuk, Berkley, MA (US); Joe Langley, Foxboro, MA (US); David Amirault, Easton, MA (US)

(73) Assignee: Cosco Management, Inc., Wilmington, DE (US)

( * ) Notice: Subject to any disclaimer, the term of this patent is extended or adjusted under 35 U.S.C. 154(b) by 263 days.

(21) Appl. No.: 12/469,585

(22) Filed: May 20, 2009

(65) Prior Publication Data

US 2010/0295346 A1    Nov. 25, 2010

(51) Int. Cl.
 *B60N 2/42* (2006.01)
(52) U.S. Cl. ............. 297/216.11; 297/216.1; 297/250.1; 297/216.13
(58) Field of Classification Search ............... 297/216.1, 297/216.11, 219.12, 180.11, 250.1, 216.12, 297/216.13, 283.4; 280/739, 729, 728.1, 280/730.1; 180/271, 274
See application file for complete search history.

(56) References Cited

U.S. PATENT DOCUMENTS

| | | | |
|---|---|---|---|
| 4,642,814 A | 2/1987 | Godfrey | |
| 4,899,961 A | 2/1990 | Herndon | |
| 4,919,483 A * | 4/1990 | Horkey | 297/395 |
| 5,235,715 A | 8/1993 | Donzis | |
| 5,292,175 A | 3/1994 | Artz | |
| 5,292,176 A | 3/1994 | Artz | |
| 5,335,968 A | 8/1994 | Sheridan et al. | |
| 5,556,169 A * | 9/1996 | Parrish et al. | 297/452.28 |
| 5,567,015 A | 10/1996 | Arias | |
| 5,881,395 A | 3/1999 | Donzis | |
| 6,485,101 B2 | 11/2002 | Kassai et al. | |
| 6,519,780 B2 | 2/2003 | Goodwin | |
| 6,786,505 B2 * | 9/2004 | Yoshida | 280/729 |
| 6,971,666 B2 * | 12/2005 | Akiyama et al. | 280/729 |
| 7,125,073 B2 * | 10/2006 | Yoshida | 297/216.11 |
| 7,232,182 B2 * | 6/2007 | Yoshida | 297/216.11 |
| 7,234,771 B2 * | 6/2007 | Nakhla | 297/250.1 |
| 7,246,853 B2 | 7/2007 | Harcourt et al. | |
| 7,293,828 B2 * | 11/2007 | Yoshida | 297/216.11 |
| 7,461,892 B2 * | 12/2008 | Bajic et al. | 297/180.16 |
| 7,654,613 B2 | 2/2010 | Bass | |
| 7,717,506 B2 * | 5/2010 | Amesar et al. | 297/216.11 |
| 7,726,734 B2 | 6/2010 | Mahal et al. | |
| 7,744,154 B2 * | 6/2010 | Marsden et al. | 297/216.11 |
| 7,748,781 B2 | 7/2010 | Bass | |

(Continued)

FOREIGN PATENT DOCUMENTS

EP    0928718    7/1999

(Continued)

OTHER PUBLICATIONS

International Preliminary Report on Patentability (Ch. II) issued in connection with PCT/US2008/087382 and completed by the US Examining Authority on Oct. 9, 2010.

(Continued)

*Primary Examiner* — Laurie Cranmer
(74) *Attorney, Agent, or Firm* — Barnes & Thornburg LLP

(57) ABSTRACT

A child restraint includes a juvenile vehicle seat and an energy-absorption apparatus coupled to the juvenile vehicle seat. The energy-absorption apparatus is configured to absorb external energy associated with an external impact force applied to the energy-absorption apparatus.

16 Claims, 5 Drawing Sheets

U.S. PATENT DOCUMENTS

| | | | |
|---|---|---|---|
| 7,774,866 B2 * | 8/2010 | Ferrara | 2/455 |
| 7,850,234 B2 * | 12/2010 | Marsden et al. | 297/216.11 |
| 2001/0043001 A1 * | 11/2001 | Kassai et al. | 297/250.1 |
| 2002/0153753 A1 | 10/2002 | Kassai | |
| 2002/0175511 A1 * | 11/2002 | Dunkle et al. | 280/743.2 |
| 2007/0085394 A1 | 4/2007 | Yang | |
| 2007/0252418 A1 | 11/2007 | Harcourt et al. | |
| 2008/0258518 A1 * | 10/2008 | Santamaria | 297/216.11 |
| 2009/0066125 A1 * | 3/2009 | Nett et al. | 297/216.11 |
| 2009/0152913 A1 | 6/2009 | Amesar et al. | |
| 2009/0179469 A1 | 7/2009 | Bass | |
| 2009/0179470 A1 | 7/2009 | Bass | |
| 2009/0256404 A1 | 10/2009 | Strong et al. | |
| 2010/0019554 A1 | 1/2010 | Mahal et al. | |
| 2010/0026064 A1 | 2/2010 | Marsden et al. | |
| 2010/0013447 A1 | 6/2010 | Bu et al. | |
| 2010/0194158 A1 | 8/2010 | Mahal et al. | |

FOREIGN PATENT DOCUMENTS

| | | |
|---|---|---|
| EP | 1167114 | 1/2002 |
| WO | 2009076514 | 6/2009 |

OTHER PUBLICATIONS

European Search Report dated Aug. 31, 2010, for related European Application No. EP 10163494.

International Search Report dated Feb. 13, 2009, for International Application No. PCT/US2008/087382.

* cited by examiner

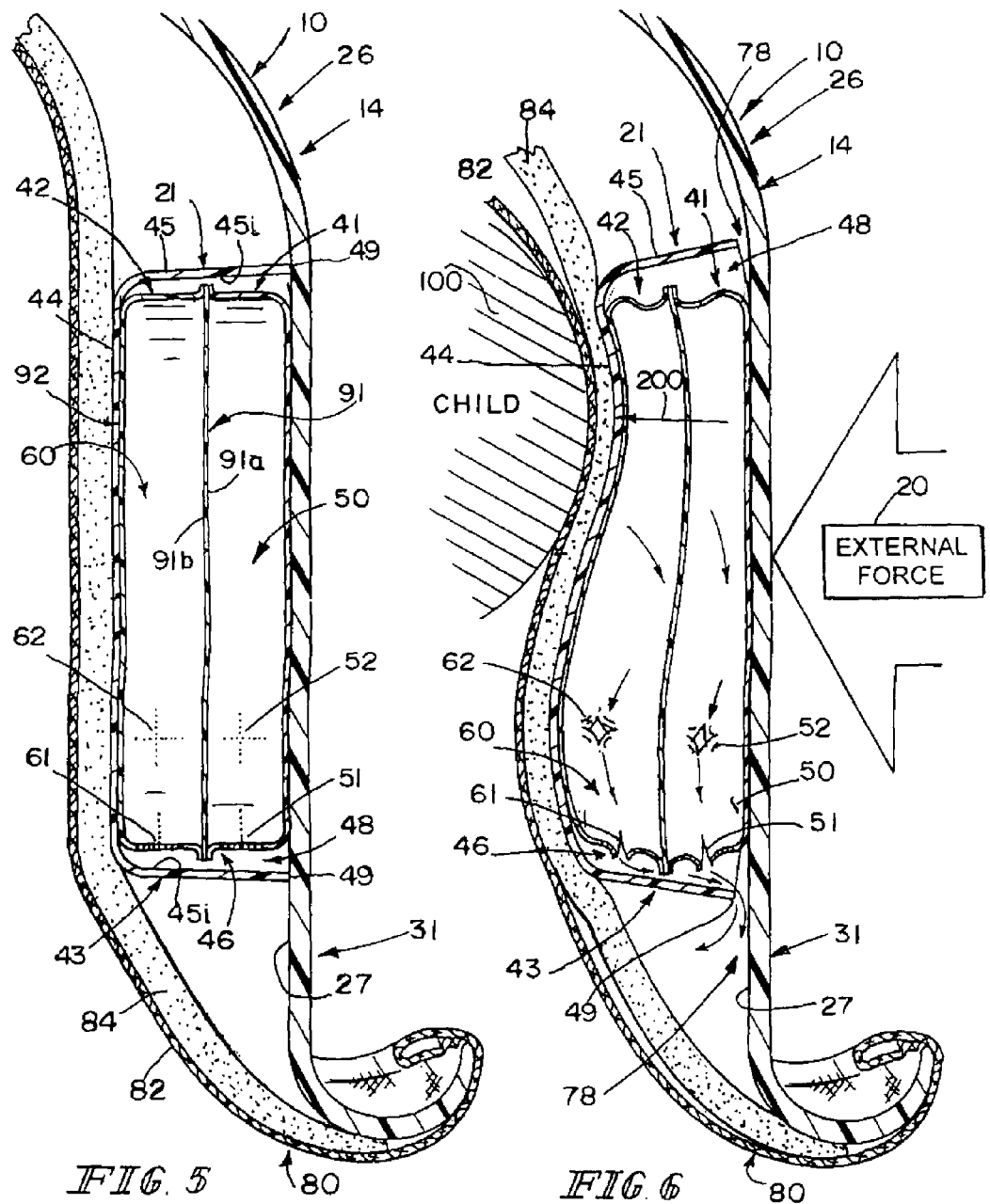

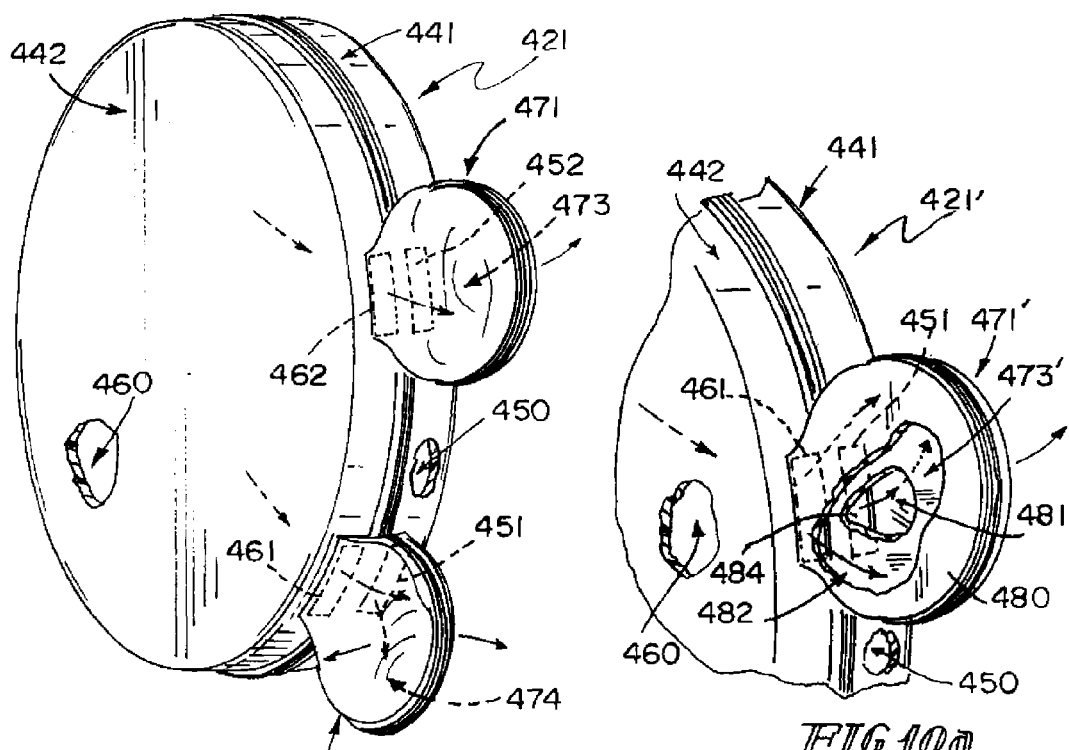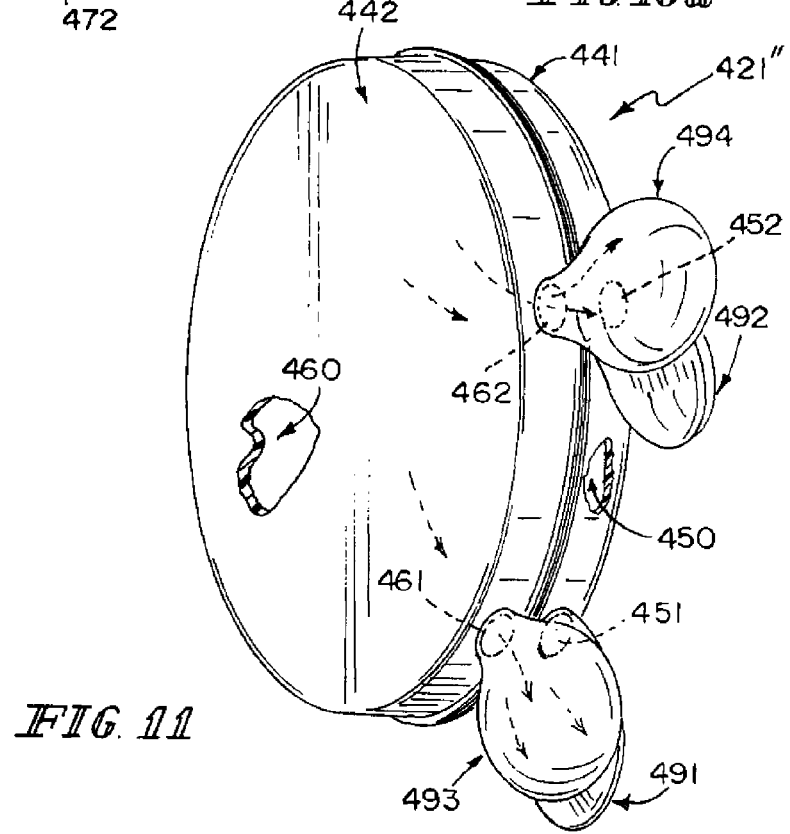

ENERGY-DISSIPATION SYSTEM

BACKGROUND

The present disclosure relates to energy-absorbing apparatus, and in particular, to devices for dissipating energy associated with external impact forces. More particularly, the present disclosure relates to an energy-dissipation system included in a juvenile product such as a child-restraint system.

When exposed to an external impact force, a juvenile vehicle seat at rest on a seat in a car or truck will accelerate as it moves to a new location in the passenger compartment of a car or truck. A child seated in such a moving juvenile vehicle seat will also accelerate as the juvenile vehicle seat moves in the passenger compartment.

A g-load is a measurement of an object's acceleration measured in gs. The g is a non-SI unit equal to the nominal acceleration-due to gravity on earth at sea level. A short-term acceleration experienced by a child seated in a juvenile vehicle seat (or any other juvenile seat) that moves suddenly is called a shock and is measured in gs.

SUMMARY

An energy-dissipation system in accordance with the present disclosure is included in an apparatus that is exposed to external impact forces. In an illustrative embodiment, the energy-dissipation system is coupled to a juvenile vehicle seat to provide a child-restraint system.

In illustrative embodiments, the energy-dissipation system includes a ride-down pad coupled to a headrest included in a juvenile vehicle seat. The ride-down pad includes one or more air bags.

Each illustrative air bag includes an air chamber and valveless-vent means for venting pressurized air developed in the air chamber through an air-discharge port only during deformation of that air bag caused by exposure of that air bag to an external impact force associated with an external impact force applied to the juvenile vehicle seat. The valveless-vent means of each air bag functions without using any valve mounted on the air bag for movement relative to the air bag from a normally closed position closing a first air-discharge port in the air bag to an opened position opening the first air-discharge port. In illustrative embodiments, the valveless-vent means includes a frangible portion of an air bag wall or a porous material.

In illustrative embodiments, an inflatable auxiliary bag is included in the first ride-down pad and coupled to a companion air bag. The inflatable auxiliary bag is formed to include an air-receiving chamber communicating with the air-discharge port of the companion air bag and receiving air discharged from the air chamber formed in the companion air bag during deformation of the companion air bag. In one illustrative embodiment, an inflatable auxiliary bag is arranged to communicate with two separate air-discharge ports formed in a companion air bag. In another illustrative embodiment, a separate inflatable auxiliary bag is provided for each air-discharge port formed in a companion air bag.

When the juvenile vehicle seat is exposed to an external impact force, each air bag is deformed when exposed to such a force. The normally inflated air bag(s) deflate to cause the ride-down pad to absorb external energy associated with the external impact force to minimize g-loads experienced by a child seated on the juvenile vehicle seat.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 5 is an enlarged sectional view taken along line 4-4 of FIG. 1 showing placement of the right-side ride-down pad on an inner wall of a first side-wing panel of the headrest before any deformation of the deformable bag-shape retainer shield and deflation of the first and second air bags is caused by application of an external impact force to the juvenile seat and before breakage of any of the cross-shaped frangible portions;

FIG. 6 shows deformation and partial deflation of each of the first and second air bags in the right-side ride-down pad following sudden application of an external impact force to the first side-wing panel of the headrest to deform the deformable bag-shape retainer shield covering the first and second air bags and showing that air is discharged from the first air chamber in the first air bag and the second air chamber in the second air bag through broken frangible portions in the first and second air bags into an interior region formed in the deformable bag-shape retainer shield when the shield and the first and second air bags are deformed and squeezed between a seated child and the external impact force to minimize the magnitude of a resulting force applied to a child seated in a juvenile vehicle seat including the right-side ride-down pad and thereby to minimize the g-load (acceleration) caused by the resulting force and experienced by the seated child;

FIG. 7 is a perspective view of a single air bag comprising two mating shells wherein each shell is made of a porous material;

FIG. 8 is a perspective view of a single air bag comprising two opposing shells and an endless strip interconnecting the two opposing shells wherein the endless strip comprises some segments made of a non-porous material and other segments made of a porous material;

FIG. 9 is a perspective view of a single air bag comprising two opposing shells and an endless strip made of a porous material and arranged to interconnect the two opposing shells;

FIG. 10 is a perspective view of a ride-down pad in accordance with another embodiment of the present disclosure wherein the ride-down pad includes two auxiliary bags and each auxiliary bag is coupled to two air bags to receive air discharged through a valveless vent formed in each of the air bags so as to inflate the auxiliary bags when the air bags are deformed;

FIG. 10a is a partial perspective view of a ride-down pad in accordance with another embodiment of the present disclosure wherein the ride-down pad includes an auxiliary bag formed to include an air-receiving chamber defined by separate first and second cavities wherein the auxiliary bag is coupled to two air bags so that air discharged through a valveless vent in the first bag flows into the first cavity in the auxiliary bag and air discharged through a valveless vent in the second bag flows into a second cavity in the auxiliary bag so as to inflate the auxiliary bag when the air bags are deformed; and FIG. 11 is a perspective view of a ride-down pad in accordance with another embodiment of the present disclosure wherein the ride-down pad includes two companion auxiliary bags for each of the two air bags and each auxiliary bag is coupled to a companion air bag to receive air discharged through a valveless vent formed in that companion air bag so as to inflate the auxiliary bags when the air bags are deformed.

DETAILED DESCRIPTION

Figure 1:
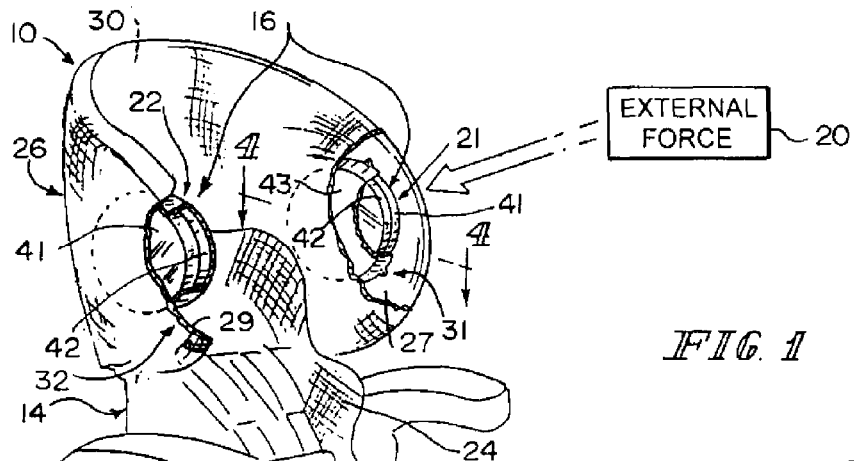
FIG. 1 is a perspective view of a child-restraint system including a juvenile vehicle seat having a seat bottom and a seat back extending upwardly from the seat bottom and an energy-dissipation system coupled to the seat back and made in accordance with a first embodiment of the present disclosure, with portions broken away, and showing that the seat back comprises a backrest coupled to the seat bottom and a headrest coupled to the backrest and that the energy-dissipation system comprises a right-side ride-down pad mounted on an inner wall of a first side-wing panel included in the headrest and a left-side ride-down pad mounted on an inner wall of an opposite second side-wing panel included in the headrest and showing an external impact force about to strike an outer portion of the first side-wing panel carrying the right-side ride-down pad.

An illustrative child-restraint system 11 includes a juvenile vehicle seat 10 and an energy-dissipation system 16 coupled to juvenile vehicle seat 10 as suggested in FIG. 1. In illustrative embodiments, juvenile vehicle seat 10 includes a seat bottom 12 and a seat back 14 extending upwardly from seat bottom 12 and carrying energy-dissipation system 16.

Each energy-dissipation system 16 comprises a ride-down pad that is designed to minimize the g-loads experienced by a child seated on seat bottom 12 of juvenile vehicle seat 10 during exposure of seat 10 to an external impact force. Ride-down pads 21, 22 are shown, for example, in FIGS. 1-6. Reference is hereby made to U.S. application Ser. No. 12/327,376 filed Dec. 4, 2008, the entirety of which is hereby incorporated by reference herein, for disclosures of various ride-down pad configurations and mounting arrangements.

Figure 2:
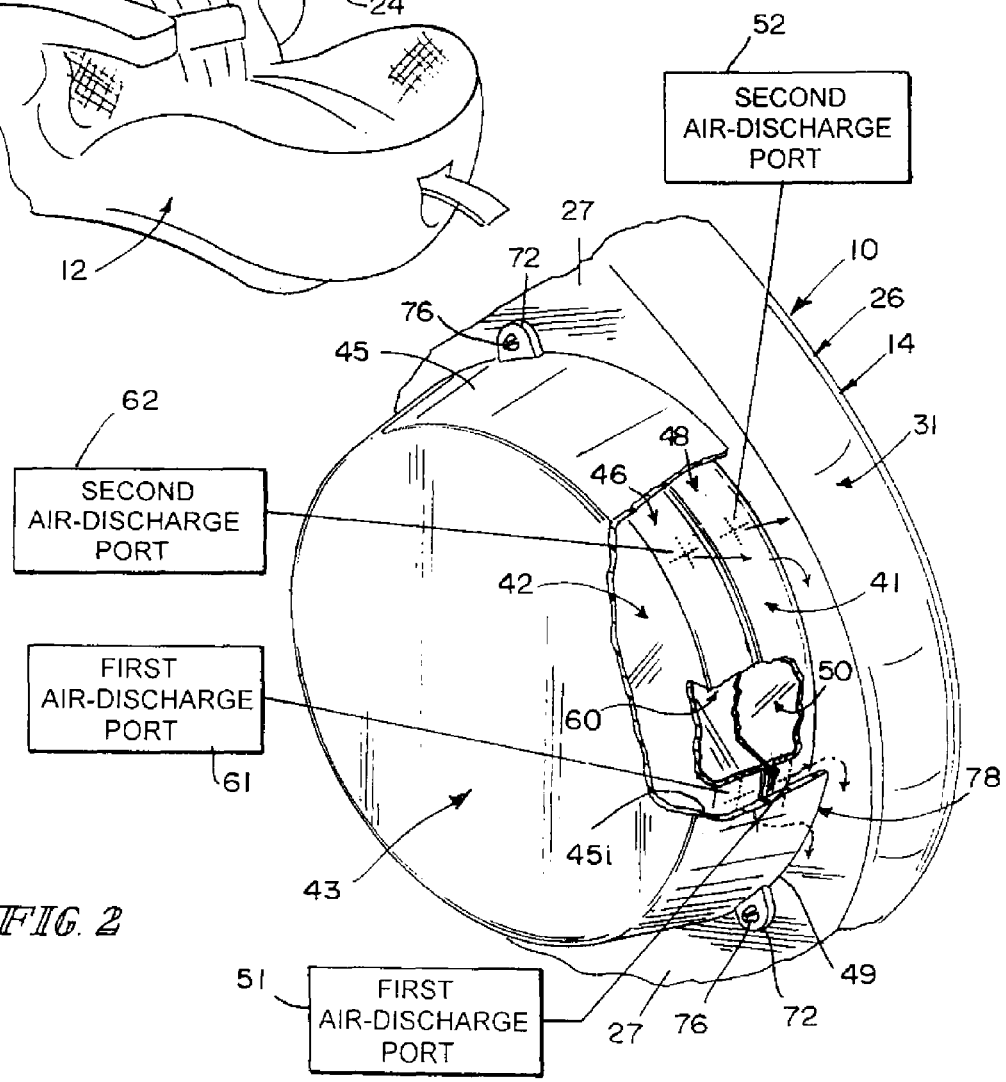
FIG. 2 is an enlarged perspective view of the right-side ride-down pad mounted on the first side-wing panel of the headrest shown in FIG. 1, with portions broken away.

As suggested in FIG. 1, seat back 12 of juvenile vehicle seat 10 includes a backrest 24 arranged to extend upwardly from seat bottom 12 and a headrest 26 coupled to backrest 24. Right-side ride-down pad 21 is coupled to an inner wall 27 of a first side-wing panel 31 included in headrest 26 as shown in FIGS. 1 and 2. Left-side ride-down pad 22 is coupled to an inner wall 29 of a second side-wing panel 32 included in headrest 26 as shown in FIG. 1. A rear panel 30 is included in headrest 26 and arranged to interconnect first and second side-wing panels 31, 32 as suggested in FIG. 1.

Figure 4:
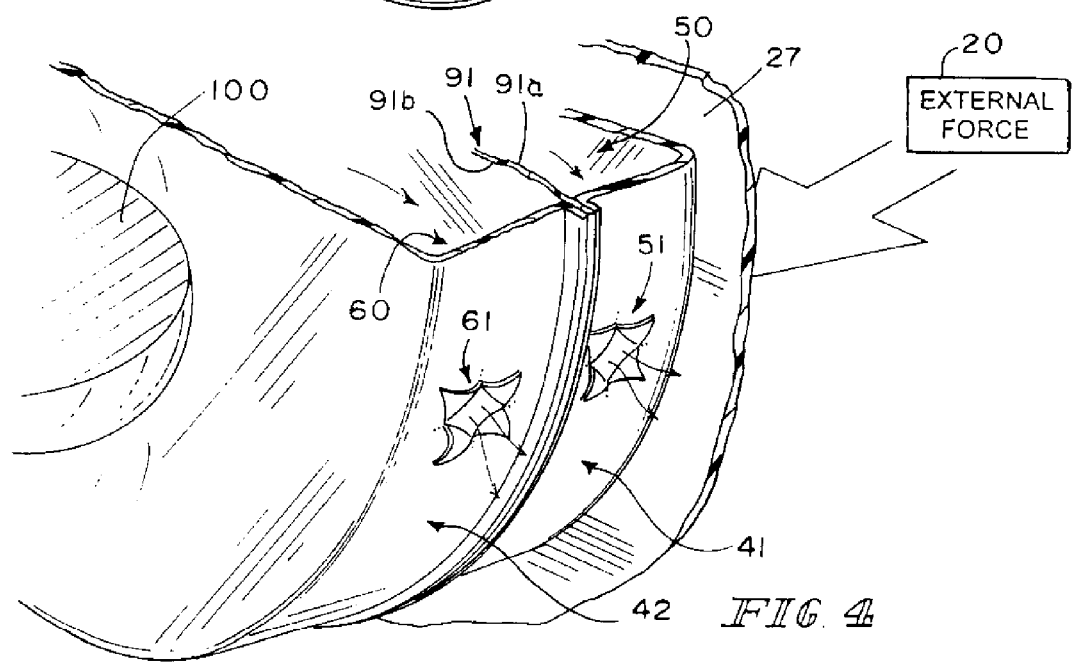
FIG. 4 is a partial perspective view similar to FIG. 3 showing that pressurized air developed in the first air chamber in the first (inner) air bag and in the second air chamber in the second (outer) air bag during deformation of the first and second air bags caused by application of an external impact force to the juvenile vehicle seat causes breakage of cross-shaped frangible portions defining the valveless vents in each of first and second air bags to open and establish air-discharge ports in each of the first and second air bags.

During a collision or other incident, application of an external impact force 20 to right-side ride-down pad 21 causes energy to be transferred from an impacting object (not shown) to right-side ride-down pad 21 as suggested in FIGS. 1, 4, and 6. Ride-down pad 21 absorbs that transferred energy as suggested in FIG. 6 to minimize the magnitude of a resulting force 200 applied to a child 100 seated in juvenile vehicle seat 10 during the collision. Ride-down pad 21 functions to minimize the g-loads (acceleration) experienced by child 100 seated on seat bottom 12 of juvenile vehicle seat 10 during exposure of seat 10 to external impact force 20 as suggested in FIG. 6. Ride-down pad 21 also functions to maximize the time interval (i.e., ride-down time) between the moment the impacting object strikes ride-down pad 21 to apply the external impact force 20 and the moment that resulting force 200 reaches zero. Ride-down pad 22 functions in a manner similar to ride-down pad 21.

Right-side ride-down pad 21 includes a first air bag 41, a second air bag 42, and a deformable bag-shape retainer shield 43 providing a protective cover for first and second air bags 41, 42 as suggested in FIG. 2. Each of first and second air bags 41, 42 is inflated normally to assume an inflated shape as shown, for example, in FIGS. 1-3 and 5. Deformable bag-shape retainer shield 43 is configured to provide means for retaining each of first and second air bags 41, 42 in its inflated shape until a sufficient external impact force 20 is applied to juvenile vehicle seat 10 to cause deformation of deformable bag-shape retainer shield 43 as suggested in FIG. 6 so that premature deflation of first and second air bags 41, 42 is avoided. Left-side ride-down pad 22 is similar in construction to right-side ride-down pad 21.

Figure 3:
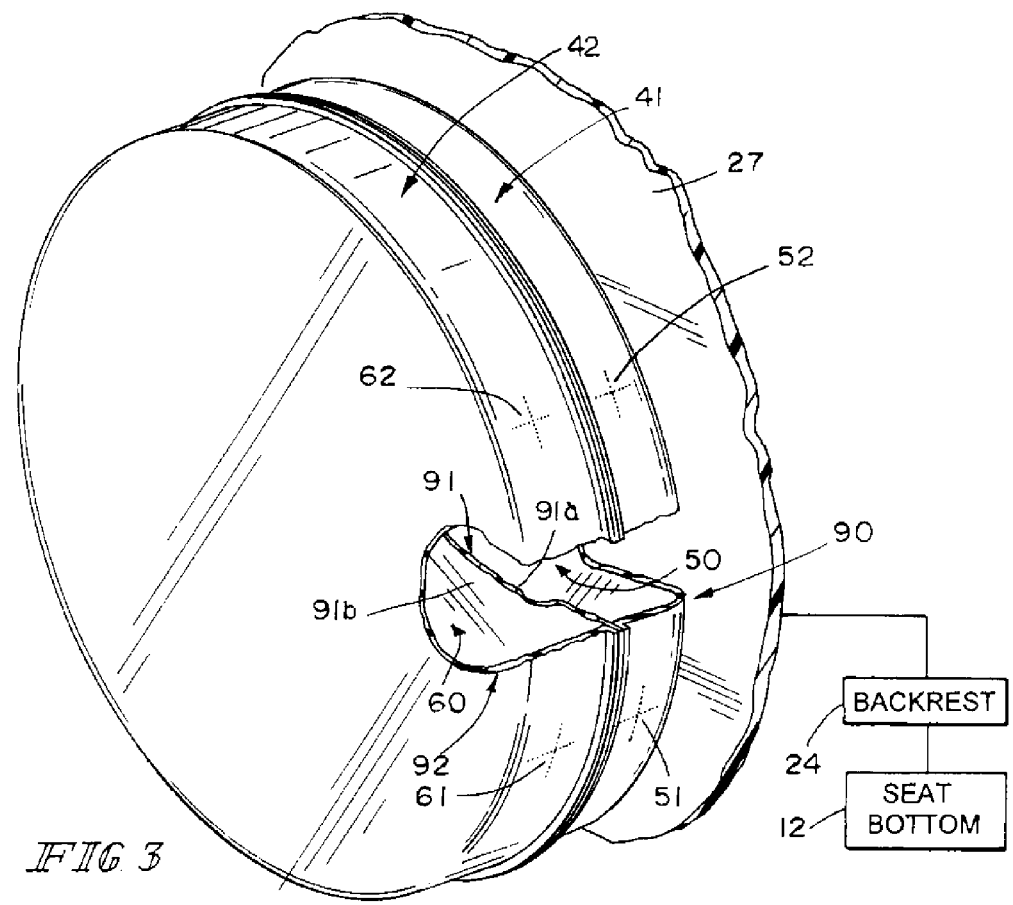
FIG. 3 is a perspective view of a portion of the right-side ride-down pad of FIG. 2 showing that the ride-down pad is a multi-stage unit comprising a first (inner) air bag formed to include a first air chamber and forwardly facing first and second air-discharge ports (e.g., cross-shaped frangible portions) opening into the first air chamber and a second (outer) air bag formed to include a second air chamber and forwardly facing first and second air-discharge ports (e.g., cross-shaped frangible portions) opening into the second air chamber, and showing that each air bag is formed to include two valveless vents and that each valveless vent is defined by a cross-shaped frangible portion formed in an air bag side wall.

First air bag 41 is formed to include a first air chamber 50 and normally closed first and second air-discharge ports 51, 52 opening into first air chamber 50 as suggested in FIGS. 2, 3, and 5. First air chamber 50 is filled with air (or other suitable fluid) to cause first air bag 41 normally to assume an inflated shape as suggested in FIGS. 2, 3, and 5. In an illustrative embodiment, first air chamber 50 contains only air.

Second air bag 42 is formed to include a second air chamber 60 and normally closed first and second air-discharge ports 61, 62 opening into second air chamber 60 as suggested in FIGS. 2-5. Second air chamber 60 is filled with air (or other suitable fluid) to cause second air bag 42 normally to assume an inflated shape as suggested in FIGS. 2, 3, and 5. In an illustrative embodiment, second air chamber 60 contains only air.

Deformable bag-shape retainer shield 43 includes a top wall 44 and a side wall 45 coupled to top wall 44 to form an interior region 46 containing first and second air bags 41, 42 as suggested in FIGS. 2, 5, and 6. Shield 43 is bowl-shaped in an illustrative embodiment and is coupled to inner wall 27 of first side-wing panel 31 of headrest 26 to form a bag-receiving space 48 therebetween. Space 48 is substantially coextensive with interior region 46 of shield 43 as shown, for example, in FIG. 2. Shield 43 is made of a deformable but somewhat rigid (e.g., plastics) material to assume a predetermined shape to shield first and second air bags 41, 42 from incidental contact so that first and second air bags 41, 42 remain in their inflated shapes until shield 43 is deformed as suggested in FIG. 6 and first and second air bags 41, 42 are exposed to an external impact force and deflated partly or fully.

In an illustrative embodiment, top wall 44 of shield 43 is round and side wall 45 is an endless strip having a frustoconical shape as suggested in FIGS. 2 and 5. Side wall 45 is arranged to surround a perimeter edge of each of first and second air bags 41, 42 as suggested in FIG. 2. Top wall 44 is coupled to side wall 45 to lie in spaced-apart relation to a portion of inner wall 27 of first side-wing panel 31 to locate bag-receiving space 48 therebetween. Side wall 45 has an annular bottom edge 49 arranged normally to mate with inner wall 27 as suggested in FIGS. 2 and 5. Top wall 44 is made of a plastics material and arranged to cooperate with side wall 45 (also made of the same plastics material) to form a monolithic element as suggested in FIGS. 2 and 5.

Child restraint 11 also includes anchor means 70 for coupling side wall 45 of deformable bag-shape retainer shield 43 to inner wall 27 of first side-wing panel 31 of headrest 26 as suggested in FIG. 2. Anchor means 70 includes a mount tab 72 coupled to side wall 45 and formed to include a fastener-receiver aperture 74 and an upstanding fastener 76 coupled to inner wall 27. Fastener 76 is arranged to extend through fastener-receiver aperture 74 as suggested in FIG. 2 to couple side wall 45 to inner wall 27. In an illustrative embodiment, there is not a sealed connection between side wall 45 and inner wall 27 and side wall 45 may deform somewhat or otherwise provide a vent space 78 between side wall 45 and inner wall 27 as suggested, for example, in FIGS. 2 and 6. In the illustrated embodiment, several companion pairs of mount tabs 72 and fasteners 76 are provided around the periphery of side wall 45.

In an illustrative embodiment, an outer cover 80 is coupled to headrest 26 and arranged to cover each of right-side and left-side ride-down pads 21, 22. Outer cover 80 functions to dissipate energy associated with external impact forces 20 and to protect ride-down pads 21, 22 from damage. In an illustrative embodiment, outer cover 80 includes an outer skin 82 and a cushion 84 under outer skin 82 as shown, for example, in FIGS. 5 and 6.

As suggested in FIG. 6, each of first and second air-discharge ports 51, 52 provided in first air bag 41 are formed to include means for discharging air from first air chamber 50 to surroundings (e.g., interior region 46 and bag-receiving space 48) outside first air bag 41 at a metered rate when first air bag 41 is exposed to external impact force 20 after deformation of deformable bag-shape retainer shield 43. Similarly, each of first and second air-discharge ports 61, 62 provided in second air bag 42 are formed to include means for discharging air from second air chamber 60 to surroundings (e.g., interior region 46 and bag-receiving space 48) outside second air bag 42 at a metered rate when second air bag 42 is exposed to external impact force 20 after deformation of deformable bag-shape retainer shield 43. As a result, after shield 43 is deformed, each of first and second air bags 41, 42 will be exposed to an external impact force to change from the inflated shape to a deflated shape so that right-side ride down pad 21 absorbs external energy associated with external impact force 20 to minimize g-loads experienced by child 100 seated in juvenile vehicle seat 10.

In the illustrated embodiment, an inner shell 90, and outer shell 92, and a partition 91 located between inner and outer shells 90, 92 cooperate to form first and second air bags 41, 42 as suggested in FIG. 5. An inner surface 91a of partition 91 mates with inner shell 90 to form first air chamber 50 therebetween and to define first air bag 41. An outer surface 91b of partition 90 mates with outer shell 90 to form second air chamber 60 therebetween and to define second air bag 42. Entirely separate first and second air bags could also be used and fall within the scope of the present disclosure. Each of air-discharge ports 51, 52, 61, 62 are arranged to face (i.e., open) toward an interior wall 45i of side wall 45 of deformable bag-shape retainer shield 43 as suggested for example, in FIGS. 2 and 5.

Figure 7:
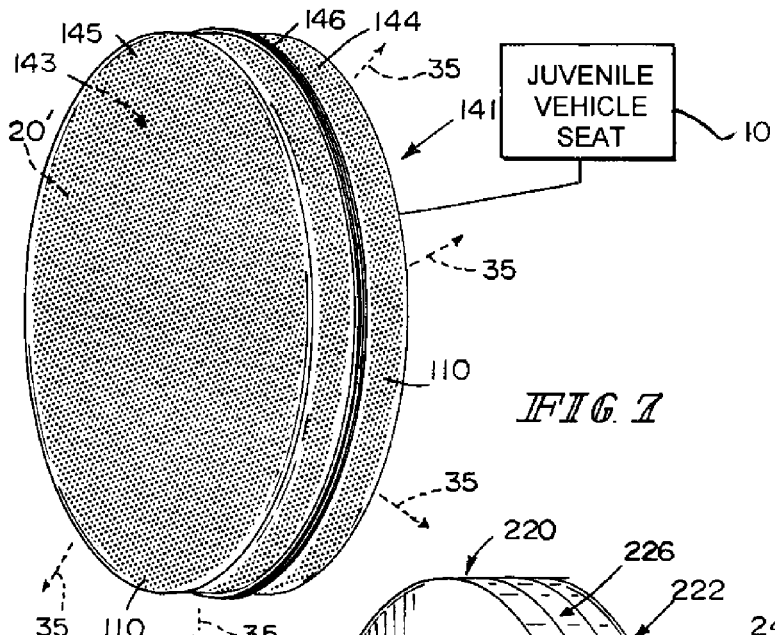
FIGS. 7-9 show alternative embodiments of an air bag for use in a ride-down pad in accordance with the present disclosure wherein the air bag includes a valveless vent defined by a porous material.
Figure 8:
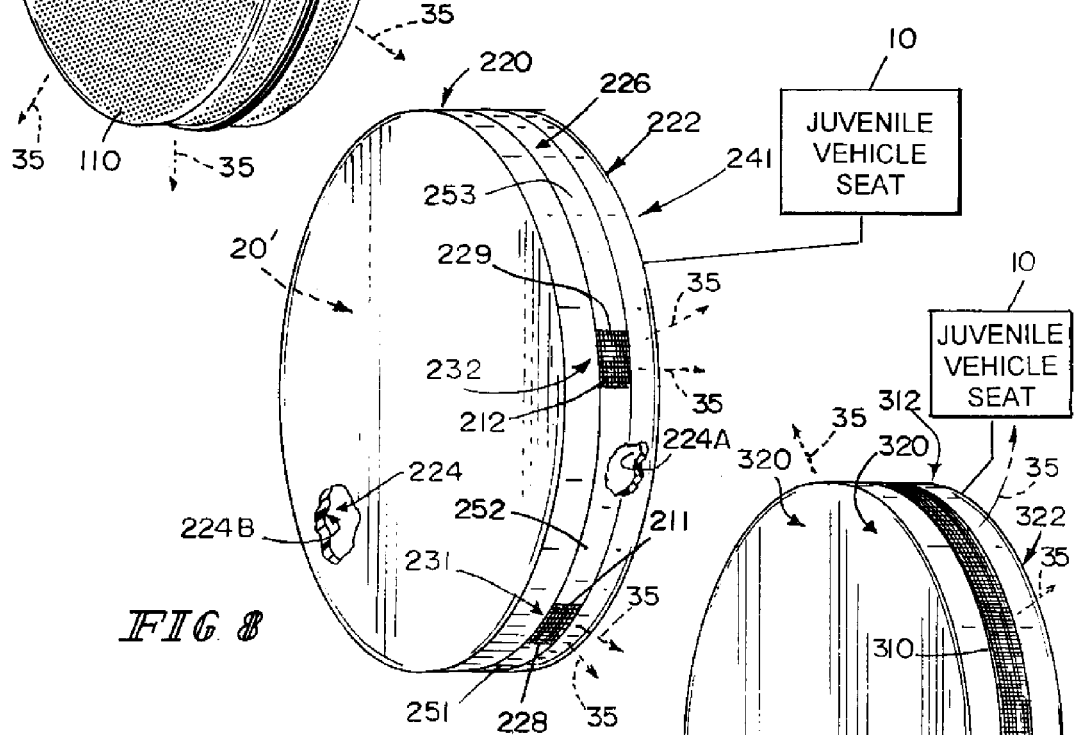
Figure 9:
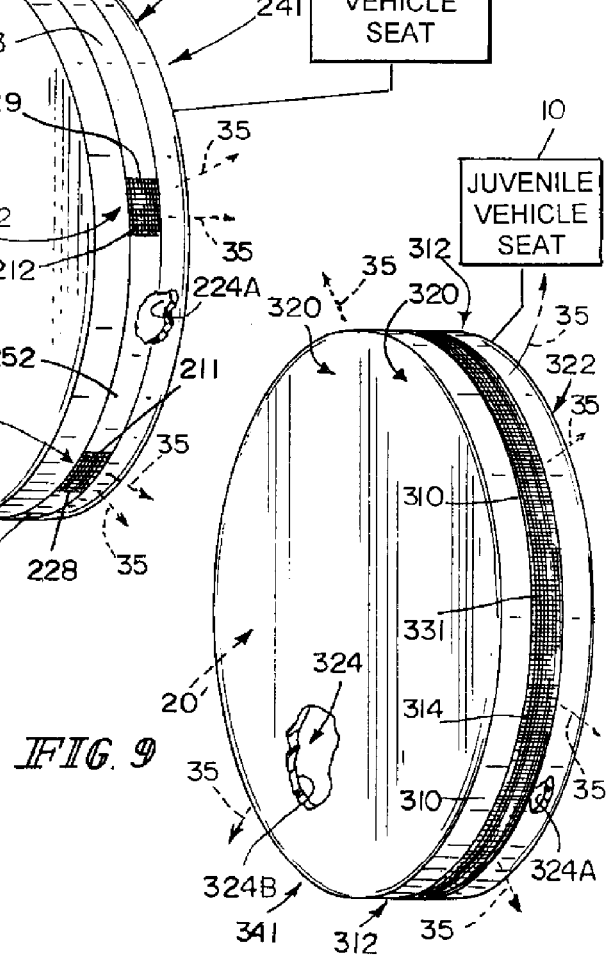

As suggested in FIGS. 7-9, air bags suitable for use in ride-down pad 21 or 22 of energy dissipation system 16 are configured to include a valveless vent defined by a porous material. A valveless vent in accordance with the present disclosure is configured to define means for venting pressurized air developed in an air chamber formed in an air bag through an air-discharge port only during deformation of the air bag caused by exposure of the air bag to an external force without using any valve mounted for movement relative to the air bag from a normally closed position closing the air-discharge port to an opened position opening the air-discharge port.

In illustrative embodiments, the porous material illustrated, for example, in FIGS. 7-9, is configured to discharge therethrough pressurized air extant in an air chamber formed in the air bag during deformation of the air bag. The porous material is also configured to provide means for readmitting air from the surroundings outside the air bag into the air chamber once the air bag is no longer exposed to an external impact force 20' applied previously to the air bag.

As suggested in FIG. 7, air bag 141 is made of a porous material 110. Air 35 extant in air chamber 143 formed in air bag 141 is discharged through an air-discharge port defined by porous material 110 during deformation (not shown) of air bag 141. Once air bag 141 is no longer exposed to an external impact force 20', then air extant in the surroundings around air bag 141 is readmitted into air chamber 143 through porous material 110. In an illustrative embodiment, substantially the entire air bag 141 is made of porous material 110.

As suggested in FIG. 7, air bag 141 includes a bowl-shaped inner shell 144 and a bowl-shaped outer shell 145 coupled to bowl-shaped inner shell 144 at a perimeter edge 146 to define air chamber 143 therebetween. Each of bowl-shaped inner and outer shells 144, 145 is made of porous material 110 in an illustrative embodiment.

As suggested in FIG. 8, air bag 241 includes a top portion 220 and a bottom portion 222 arranged to lie in spaced-apart relation to top portion 220 to define an air chamber 224 therebetween. Air bag 241 also includes a side wall 226 arranged to interconnect top and bottom portions 220, 222 and define a boundary of air chamber 224. Side wall 226 is formed to include a first opening 228 and a second opening 229 arranged to lie in spaced-apart relation to first opening 228.

In the embodiment illustrated in FIG. 8, air bag 241 includes a first valveless vent 231 defined by a first portion 211 of a porous material (of the type described in connection with the embodiment of FIG. 7) and arranged to close first opening 228. In an illustrative embodiment, first portion 211 of the porous material is coupled at least to adjacent portions of side wall 226. Air bag 241 also includes a second valveless vent 232 defined by a second portion 212 of a porous material (of the type described in connection with the embodiment of FIG. 7) and arranged to close second opening 228. In an illustrative embodiment, second portion 212 of the porous material is coupled at least to adjacent portions of side wall 226.

In an illustrative embodiment, side wall 226 includes a strip comprising a first segment 251 made of a non-porous material, a second segment 252 made of a non-porous material, and a third segment 253 made of a non-porous material as suggested in FIG. 8. First portion 211 of the porous material is arranged to lie between and interconnect first and second segments 251, 252. Second portion 212 of the porous material is arranged to lie between and interconnect second and third segments 252, 253.

In an illustrative embodiment, as suggested in FIG. 8, bottom portion 222 is a bowl-shaped inner shell having a concave surface 224A bordering air chamber 224 and facing away from juvenile vehicle seat 10. Top portion 220 is a bowl-shaped outer shell having a concave surface 224B bordering air chamber 224 and facing toward concave surface 224A. The strip comprising first, second, and third segments 251, 252, and 253 and first and second portions 211, 212 of porous material is endless. That strip includes a lower edge coupled to bowl-shaped inner shell 222 and an upper edge coupled to bowl-shaped outer shell 220 as suggested in FIG. 8.

In the embodiment illustrated in FIG. 9, air bag 341 includes a valveless vent 331 defined by and endless strip made of a porous material (of the type described in connection with the embodiment of FIG. 7). Air bag 341 is formed to include an air chamber 324 and an endless opening 310 in a side wall 312 of air bag 341 and endless strip 314 of porous material is arranged to close endless opening 310 formed in air bag 341. In an illustrative embodiment, air bag 341 includes a bowl-shaped inner shell 322 having a concave surface 324A facing away from juvenile vehicle seat 10 and bordering air chamber 324. Air bag 341 also includes a bowl-shaped outer shell 320 having a concave surface 324B bordering air chamber 324 and facing toward concave surface 324A. Endless strip 314 interconnects inner and outer shells 322, 320 as suggested in FIG. 9. In an illustrative embodiment, endless strip 314 includes a lower edge coupled to inner shell 322 and an upper edge coupled to outer shell 320 as suggested in FIG. 9.

Other embodiments of ride-down pads in accordance with the present disclosure are shown, for example, in FIGS. 10, 10a, and 11. In each of these embodiments, a ride-down pad 421 includes a first air bag 441 formed to include a first air chamber 450 and a second air bag 442 formed to include a second air chamber 460. First air bag 441 is formed to include a first valveless vent 451 providing a first air-discharge port opening into first air chamber 450 and a spaced-apart second valveless vent 452 providing a second air-discharge port opening into second air chamber 460. Second air bag 442 is formed to include a first valveless vent 461 providing a first air-discharge port opening into second air chamber 460 and a spaced-apart second valveless vent 462 providing a second air-discharge port opening into second air chamber 460. A valveless vent in accordance with the present disclosure is configured to define means for venting pressurized air developed in an air chamber formed in an air bag through an air-discharge port only during deformation of the air bag caused by exposure of the air bag to an external force without using any valve mounted for movement relative to the air bag from a normally closed position closing the air-discharge port to an opened position opening the air-discharge port.

As suggested in FIG. 10, ride-down pad 421 includes a first inflatable auxiliary bag 471 formed to include a first air-receiving chamber 473 and a second inflatable auxiliary bag 472 formed to include a second air-receiving chamber 474. First inflatable auxiliary bag 471 is coupled to first air bag 441 to cause air discharged from first air chamber 450 formed in first air bag 441 to enter first air-receiving chamber 473 formed in first inflatable auxiliary bag 471 and inflate that auxiliary bag 471. In an illustrative embodiment, first inflatable auxiliary bag 471 is also coupled to second air bag 442 to cause air discharged from second air chamber 460 formed in second air bag 442 to enter first air-receiving chamber 473 formed in first inflatable auxiliary bag 471 and inflate that auxiliary bag 471.

As also suggested in FIG. 10, second inflatable auxiliary bag 472 is coupled to first air bag 441 to cause air discharged from first air chamber 450 formed in first air bag 441 to enter second air-receiving chamber 474 formed in second inflatable auxiliary bag 472 and inflate that auxiliary bag 472. In an illustrative embodiment, second inflatable auxiliary bag 472 is also coupled to second air bag 442 to cause air discharged from second air chamber 460 formed in second air bag 442 to enter second air-receiving chamber 474 formed in second inflatable auxiliary bag 472 and inflate that auxiliary bag 472. In an illustrative embodiment, each of first and second inflatable auxiliary bags 471, 472 is formed to assume a predetermined shape when inflated.

As suggested in FIG. 10a, in a ride-down pad 421', each of the auxiliary bags are modified somewhat to include multiple air-receiving cavities. For example, first auxiliary bag 471' includes (1) an outer skin 480 coupled to first and second air bags 441, 442 and formed to include air-receiving chamber 473' and (2) a partition 484 located in first air-receiving chamber 473' and coupled at perimeter edges thereof to outer skin 480. Partition 484 is configured to provide means for dividing first air-receiving chamber 473' into a first cavity 481 communicating only with first air-discharge port 451 to receive air discharged from first air chamber 450 formed in first air bag 441 and a second cavity 482 communicating only with first air-discharge port 461 to receive air discharged from second air chamber 460 formed in second air bag 442. In an illustrative embodiment, first auxiliary bag 471' is formed to assume a predetermined shape when inflated using air discharged from first air chamber 450 formed in first air bag 441. It is within the scope of this disclosure to provide a second air bag for use in the embodiment of FIG. 10a by modifying second air bag 472 shown in FIG. 10 along the lines suggested for auxiliary bag 471'.

As suggested in FIG. 11, a ride-down pad 421" includes a separate auxiliary bag is placed in fluid communication with each of the air-discharge ports 451, 452, 461, and 462. For example, first inflatable auxiliary bag 491 is coupled to, first air bag 441 to receive air discharged through first air-discharge port 451, second inflatable auxiliary bag 492 is coupled to first air bag 441 to receive air discharged through second air-discharge port 452, third inflatable auxiliary bag 493 is coupled to second air bag 442 to receive air discharged through first air-discharge port 461, and fourth inflatable auxiliary bag 494 is coupled to second air bag 442 to receive air discharged through second air-discharge port 462. Each of inflatable auxiliary bags 491, 492, 493, and 494 is formed to include an air-receiving chamber placed in fluid communication with one of air-discharge ports 451, 452, 461, and 462 as shown, for example, in FIG. 11.

The invention claimed is:
1. A child restraint comprising
a juvenile vehicle seat;
an energy-dissipation system coupled to the juvenile vehicle seat, the energy-dissipation system including a first ride-down pad including a first air bag formed to include a first air chamber and valveless-vent means for venting pressurized air developed in the first air chamber through a first air-discharge port only during deformation of the first air bag caused by exposure of the first air bag to an external impact force associated with an external impact force applied to the juvenile vehicle seat without using valve mounted for movement relative to the first air bag from a normally closed position closing the first air-discharge port to an opened position opening the first air-discharge port;

wherein the valveless-vent means is defined by a porous material configured to discharge therethrough pressurized air extant in the first air chamber during deformation of the first air bag and configured to provide means for readmitting air from surroundings outside the first air bag into the first air chamber once the first air bag is no longer exposed to the external impact force applied previously to the first air bag;

wherein the first air bag includes a top portion, a bottom portion arranged to lie in spaced-apart relation to the top portion to define the first air chamber therebetween, and a side wall arranged to interconnect the top and bottom portions and to define a boundary of the first air chamber and the side wall is formed to include a first opening and a first portion of the porous material is coupled to the side wall and arranged to close the first opening; and wherein the side wall includes a strip comprising a first segment made of a non-porous material, a second segment made of a non-porous material, and a third segment made of a non-porous material, a first portion of the porous material is arranged to lie between and interconnect the first and second segments, and a second portion of the porous material is arranged to lie between and interconnect the second and third segments.

2. The child restraint of claim 1, wherein the valveless-vent means is defined by a frangible portion of a wall included in the first air bag and configured to break to form the first air-discharge port only when pressure of air inside the first air chamber exceeds a predetermined superatmospheric pressure.

3. The child restraint of claim 2, wherein the frangible portion is cross-shaped.

4. The child restraint of claim 2, wherein the frangible portion is established by a perforated section in the wall.

5. The child restraint of claim 1, wherein the first ride-down pad further includes a second air bag arranged to lie alongside the first air bag and formed to include a second air chamber and the second air bag is formed to include valveless-vent means for venting pressurized air developed in the second air chamber through a second air-discharge port during deformation of the second air bag caused by exposure of the second air bag to an external impact force associated with the external impact force applied to the juvenile vehicle seat without using any valve mounted for movement relative to the second air bag from a normally closed position closing the second air-discharge port to an opened position opening the second air-discharge port.

6. The child restraint of claim 5, wherein the valveless-vent means of the second air bag is defined by a frangible portion of a wall included in the second air bag and configured to break to form the second air-discharge port only when pressure of air inside the second air chamber exceeds a predetermined superatmospheric pressure.

7. The child restraint of claim 1, wherein substantially the entire first air bag is made of the porous material.

8. The child restraint of claim 7, wherein the first air bag includes a bowl-shaped inner shell and a bowl-shaped outer shell coupled to the bowl-shaped inner shell at a perimeter edge to define the first air chamber therebetween and each of the bowl-shaped inner and outer shells is made of the porous material.

9. The child restraint of claim 1, wherein the side wall is also formed to include a second opening separated from the first opening and a second portion of the porous material is coupled to the side wall and arranged to close the second opening.

10. The child restraint of claim 1, wherein the bottom portion is a bowl-shaped inner shell having a concave surface facing away from the juvenile vehicle seat, the top portion is a bowl-shaped outer shell having a concave surface facing toward the concave surface of the bowl-shaped inner shell, and the strip is endless and includes a lower edge coupled to the bowl-shaped inner shell and an upper edge coupled to the bowl-shaped outer shell.

11. A child restraint comprising
a juvenile vehicle seat;
an energy-dissipation system coupled to the juvenile vehicle seat, the energy-dissipation system including a first ride-down pad including a first air bag formed to include a first air chamber and valveless-vent means for venting pressurized air developed in the first air chamber through a first air-discharge port only during deformation of the first air bag caused by exposure of the first air bag to an external impact force associated with an external impact force applied to the juvenile vehicle seat without using any valve mounted for movement relative to the first air bag from a normally closed position closing the first air-discharge port to an opened position opening the first air-discharge port;

wherein the valveless-vent means is defined by a porous material configured to discharge therethrough pressurized air extant in the first air chamber during deformation of the first air bag and configured to provide means for readmitting air from surroundings outside the first air bag into the first air chamber once the first air bag is no longer exposed to the external impact force applied previously to the first air bag; and wherein the first air bag has a side wall, the side wall includes an endless opening extending about a perimeter of the first air bag, and the porous material is an endless strip arranged to close the endless opening.

12. A child restraint comprising
a juvenile vehicle seat;
an energy-dissipation system coupled to the juvenile vehicle seat, the energy-dissipation system including a first ride-down pad including a first air bag formed to include a first air chamber and valveless-vent means for venting pressurized air developed in the first air chamber through a first air-discharge port only during deformation of the first air bag caused by exposure of the first air bag to an external impact force associated with an external impact force applied to the juvenile vehicle seat without using any valve mounted for movement relative to the first air bag from a normally closed position closing the first air-discharge port to an opened position opening the first air-discharge port;

wherein the valveless-vent means is defined by a porous material configured to discharge therethrough pressurized air extant in the first air chamber during deformation of the first air bag and configured to provide means for readmitting air from surroundings outside the first air bag into the first air chamber once the first air bag is no longer exposed to the external impact force applied previously to the first air bag; and wherein the first air bag includes an inner shell having a concave surface facing away from the juvenile vehicle seat, an outer shell having a concave surface facing toward the concave surface of the inner shell, and an endless strip interconnecting the inner and outer shells and having a lower edge coupled to the inner shell and an upper edge coupled to the outer shell, and wherein the endless strip is made of the porous material.

13. A child restraint comprising
a juvenile vehicle seat;
an energy-dissipation system coupled to the juvenile vehicle seat, the energy-dissipation system including a first ride-down pad including a first air bag formed to include a first air chamber and valveless-vent means for venting pressurized air developed in the first air chamber through a first air-discharge port only during deformation of the first air bag caused by exposure of the first air bag to an external impact force associated with an external impact force applied to the juvenile vehicle seat without using any valve mounted for movement relative to the first air bag from a normally closed position closing the first air-discharge port to an opened position opening the first air-discharge port;
wherein the first ride-down pad further includes an inflatable auxiliary bag formed to include an air-receiving chamber and coupled to the first air bag to cause air discharged from the first air chamber formed in the first air bag to enter into the air-receiving chamber formed in the inflatable auxiliary bag and inflate the inflatable auxiliary bag; and
wherein the first ride-down pad further includes a second air bag arranged to lie alongside the first air bag and formed to include a second air chamber and the second air bag is formed to include valveless-vent means for venting pressurized air developed in the second air chamber through a second air-discharge port during deformation of the second air bag caused by exposure of the second air bag to an external impact force associated with the external impact force applied to the juvenile vehicle seat without using any valve for movement relative to the second air bag from a normally closed position closing the second air-discharge port to an opened position opening the second air-discharge port and wherein the auxiliary bag is also coupled to the second bag to cause air discharged from the second air chamber formed in the second air bag to enter the air-receiving chamber formed in the inflatable auxiliary bag and inflate the inflatable auxiliary bag.

14. The child restraint of claim 13, wherein the first ride-down pad further includes a partition located in the air-receiving chamber and coupled to the inflatable auxiliary bag and configured to provide means for dividing the air-receiving chamber into a first cavity communicating only with the first air-discharge port to receive air discharged from the first air chamber formed in the first air bag and a second cavity communicating only with the second air-discharge port to receive air discharged from the second air chamber formed in the second air bag.

15. The child restraint of claim 13, wherein the inflatable auxiliary bag is formed to assume a predetermined shape when inflated using air discharged from the first air chamber formed in the first air bag.

16. A child restraint comprising
a juvenile vehicle seat;
an energy-dissipation system coupled to the juvenile vehicle seat, the energy-dissipation system including a first ride-down pad including a first air bag formed to include a first air chamber and valveless-vent means for venting pressurized air developed in the first air chamber through a first air-discharge port only during deformation of the first air bag caused by exposure of the first air bag to an external impact force associated with an external impact force applied to the juvenile vehicle seat without using any valve mounted for movement relative to the first air bag from a normally closed position closing the first air-discharge port to an opened position opening the first air-discharge port;
wherein the first ride-down pad further includes an inflatable auxiliary bag formed to include an air-receiving chamber and coupled to the first air bag to cause air discharged from the first air chamber formed in the first air bag to enter into the air-receiving chamber formed in the inflatable auxiliary bag and inflate the inflatable auxiliary bag; and
wherein the first bag further includes second valveless-vent means for venting pressurized air developed in the first air chamber through a second air-discharge port in the first air bag only during deformation of the first air bag caused by exposure of the first air bag to the external impact force without using any valve mounted for movement relative to the first air bag from a normally closed position closing the second air-discharge port to an opened position opening the second air-discharge port and a second inflatable auxiliary bag formed to include a second air-receiving chamber and coupled to the first air bag to cause air discharged from the first air chamber through the second air-discharge port to enter into the second air-receiving chamber formed in the second inflatable auxiliary bag.

* * * * *